May 14, 1935. E. V. MYERS 2,000,980
SAFETY BELT OR THE LIKE
Filed Nov. 3, 1931
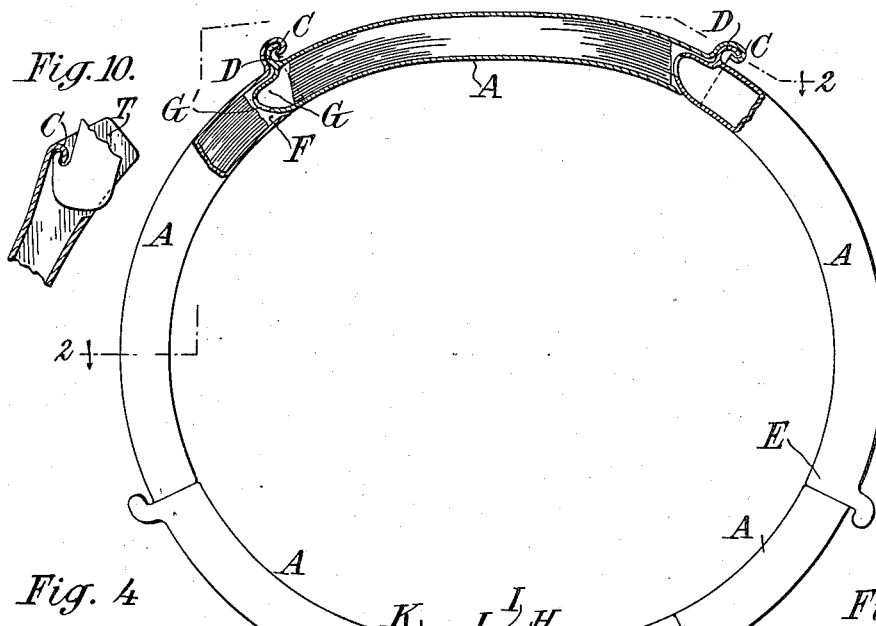
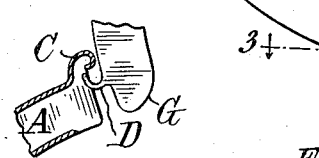
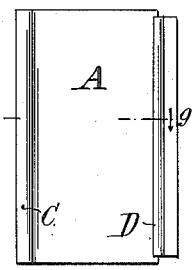
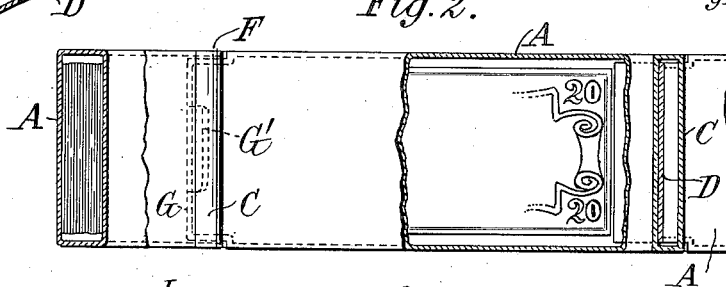
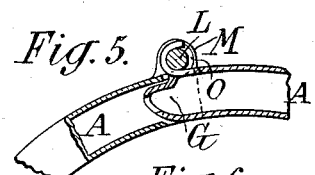
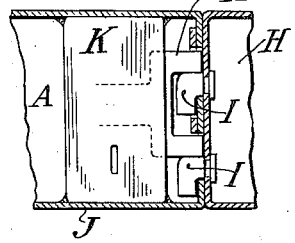
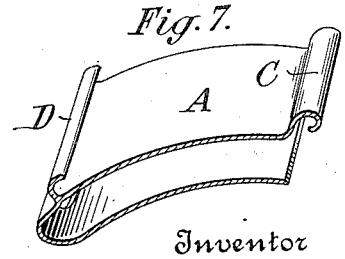
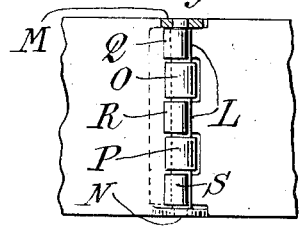
Inventor
Eugene V. Myers,
By his Attorneys,
Fraser, Myers & Manley Patented May 14, 1935

2,000,980

UNITED STATES PATENT OFFICE 2,000,980

SAFETY BELT OR THE LIKE

Eugene V. Myers, East Orange, N. J.

Application November 3, 1931, Serial No. 572,755

14 Claims. (Cl. 224—5)

This invention relates to safety belts or the like, and aims to provide certain improvements therein.

The invention provides a safety belt for money or other valuables which possesses a high resistance to robbery in any form.

In the preferred structure it comprises a series of link-like compartments, each of which is separable from the others, but which is separable only in a position which it is impossible for it to assume when upon the wearer. Except in the releasing position the end of each link constitutes a closure for the opening of the next link. Preferably the belt comprises a substantially closed metallic structure which makes it exceedingly difficult to introduce any tool, such as prying tools, and which presents a body of such nature that cutting tools of the character ordinarily useable cannot successfully be applied. In the preferred form the belt has the capacity for adjustment to different sizes by the insertion of a greater or less number of compartment links, and also by the insertion of one or more shortened filler links. The free ends of the belt are connected together when around the wearer by some form of locking means, such as a padlock, Yale lock or combination lock.

Referring to the drawing which shows several forms of the invention,—

Figure 1 is a plan, partly in section, of one form of the invention.

Fig. 2 is a view on the line 2—2 in Fig. 1.

Fig. 3 is a section on the line 3—3 in Fig. 1.

Fig. 4 is a detail, showing the position of disassembly of the links.

Fig. 5 is a section of a modified form of hinge.

Fig. 6 is an elevation of Fig. 5.

Fig. 7 is a section of a half-length link.

Fig. 8 is an elevation of a modified form of link.

Fig. 9 is a section on line 9—9 of Fig. 8.

Fig. 10 is a detail of a modification.

Referring to the drawing, A designates what I may call a compartment link, the interior of which is preferably a substantially closed chamber except at one end, and the ends of which are so constructed as to be detachably engaged with similar links on each side or with filler links. The links A may be made of various metals and in various ways. For ordinary purposes, such as conveying payrolls through the streets, a lighter construction may be used than with belts designed for very valuable loads. Thus for uses where the general method of robbery would be a street hold-up, a heavy sheet metal hardened if desired will prove sufficiently safe. If the contents are very valuable, however, each of the links A may be made of hardened steel castings, such as will resist any cutting tool which is apt to be applied. If it is desired to resist cutting flames, the links may be made of built-up layers of steel and copper, the copper having the effect of dissipating the heat of the flame very rapidly, and hence resisting the approach of the fusing point.

The hinging of the compartments together may be accomplished in various ways.

In the construction illustrated in Figs. 1 to 4, 7, 8 and 9, I have shown a hinged joint which comprises two interlocking flanges C and D. The flange C is shown as extending outwardly beyond the outer face of the link and curved inwardly while the flange D is shown as interlocking with the flange C and having a reverse curvature. This construction makes a joint which is difficult to dislodge. The hinges cannot be separated endwise because of walls E and F. Such construction gives very close to a continuous exterior to the belt which may be increased by forming the walls as shown in Fig. 10, at T.

The links should be made so that it is impossible to separate them, except when they are relatively moved to a position of angularity such, for instance, that illustrated in Fig. 4. Two links can never be moved to this position without separating the belt from the wearer. In the construction of Figs. 5 and 6, wherein a pintle is used, the contiguous walls of the two links prevent a separation of the adjacent links, unless the links are moved to an outward angular position similar to that shown in Fig. 4. In Figs. 5 and 6 the pintle L is confined between side plates or lugs M and N, and is held by hooks O and P formed on one of the links. The other link is provided with hooks Q, R and S, engaging the pintle between the lugs M and N, and hooks O and P.

Preferably each link has a substantially closed body portion except at one end where it is left open for the insertion of bills, etc. The opposing link, however, is provided with means whereby this opening is closed except in the outward angular position. In the construction shown this is done by means of a curved wall G which enters the opening of the adjacent link and continues to close such opening until the outward angular position is reached. The opposite end of the compartment may be provided with a small aperture G' for the insertion of a pencil or the like in case the bills should stick in the compartment. This enables the stack of bills to be pushed outward sufficiently so they can be easily removed from the links. The provision of the wall G constitutes an additional obstruction to the use of a cutting tool along the line of the links. In order to separate the links by cutting, one member of the cutting tool would have to bear against the inner wall G while the outer member was bearing against the metal along the hinged joint. This would make the cutting operation very difficult.

In Fig. 7 I have shown a short link which may be used as a dummy link, or might be used for coins. By the employment of one or more of these dummy links and one or more additional compartment links, the belt can be expanded as desired to fit different users. The two end links may be fixedly or detachably secured to two lock sections if these are used. In the drawing one of the links is shown as containing a part of the locking mechanism. The other lock section is shown as detachably secured to an adjacent link. Any form of secure locking means may be employed, but I prefer that illustrated wherein one of the locking sections H is provided with two or more strong hook projections I I which are designed to fit into openings in the end of the second locking section J, and then moved downwardly to engage the inner wall of such section, the lock K being provided with a bolt K' having two prongs which are designed to be thrown over the two locking hooks so as to prevent raising the latter after they have been inserted and dropped behind the front wall. This construction practically closes the opening between the two locking sections and renders the insertion of a tool very difficult. The lock itself may be of any approved construction, and may be of the Yale type or preferably of the combination type. It may be also a padlock of sufficient strength connecting two or more hoops of the locking sections.

A suitable design is one in which the compartments are four in number to suit, let us say, a 36 waist, and they are designed to receive, let us say, the conventional size of bills of the United States which will make them approximately seven inches long and three and one-half inches wide. For larger capacities, the compartments may be pivoted on their sides and receive bills sidewise, in which case each compartment would be approximately three and one-half inches in a direction around the wearer and approximately seven inches in a vertical direction. Such a construction is shown in Figs. 8 and 9.

When used in carrying money from a bank, for instance, the bank messenger may carry the belt in an unlocked condition to the bank. The messenger need not know the combination in case a combination lock is used, nor have a key in case a Yale lock or padlock is used. Upon arriving at the bank, the links may be disassembled by moving them to an outward angular position, the money inserted, and the sections then again hooked up. This is a very simple operation, and when the belt is laid over on its outer side, it will not come apart, and can be manipulated without any danger of falling apart while it is being adjusted about the person of the messenger. When the links are disassembled, the open ends of the links are accessible for the introduction of money, but when they are assembled, all openings are closed. Upon arriving at the destination, the belt is unlocked and the links disassembled and the money removed through the ends. If a succession of different sized messengers are employed, the belt can be easily made up to fit by the use of the accessory links.

When the belt is adjusted in place, it is impossible to remove the contents without removing it, and this cannot be done with any tool which it is at all probable can be utilized by street robbers or the like.

Each of the compartment links may be of the same curvature, or those intended for the back and front may be of somewhat less curvature, as shown in the drawing. Indeed, the links may be made straight if desired, and this is particularly true of the construction shown in Figs. 8 and 9, where the links are of short dimensions circumferentially and long dimensions vertically.

While I have shown and described several forms of the invention, it will be understood that I do not wish to be limited thereto, since various changes may be made therein without departing from the spirit of the invention.

What I claim is:

1. A safety belt comprising a plurality of metallic compartments provided with hinging members at opposite ends, said hinging members being detachable only when the compartments are in a predetermined angular relation to each other which they cannot assume when the belt is on the body of the wearer, and said hinging members comprising inter-engaging hook members connectable in such angular relation and unconnectable in other relations.

2. A safety belt comprising a series of metallic compartments, each of which is formed with a hook member at one end directed inwardly toward the body of the wearer, and a similar hook member at the other end directed outwardly away from the body of the wearer whereby adjacent links may be detachably connected to form a complete belt.

3. A safety belt comprising a plurality of sheet metal compartments, the adjacent ends of which have a hook engagement with each other, which hook engagement comprises a hinge, the hinge being detachable only when the adjacent sheet metal compartments are moved to an angular outward position which they cannot assume when the belt is in position upon the body of the wearer, said compartments having an open end and a closed end, and the adjacent end of one compartment being closed and of the other compartment being open, and the closed end being curved so that it closes the open end of the other when the belt is in position upon the body of the wearer.

4. A safety belt comprising a series of compartments, such compartments abutting each other when the belt is in position upon the body of the wearer, and having hinging connections one with another, such hinging connections being detachable by a relative angular movement of the compartments to a point not possible when the belt is in position upon the body of the wearer.

5. A safety belt having a series of compartments, hinge joints between adjacent compartments, said hinge joints being separable by abnormal angular movements of the compartments relatively to each other, and a relatively small compartment adapted to engage adjacent compartments on both sides to vary the length of the belt.

6. A safety belt comprising a series of compartments hinged together with butt joints, whereby the compartments extend substantially completely around the belt, and in substantially unbroken form, the connecting sides of the compartments abutting each other closely to resist the introduction of a tool between them, and means for locking the series of compartments together to form a circular belt, the hinge joints between the compartments being detachable when the compartments are moved angularly to a position which they cannot occupy when the belt is on the body of the wearer, and some compartments having portions completely closing others when in all positions when the belt is on the body of the wearer.

7. A safety belt comprising when in position on the body of the wearer a closed ring of hollow metallic members, each having an opening in one end and arranged end to end in close abutting relation to provide a substantially continuous double walled structure of material width and thickness, the members being connected together by hinged joints, the joints being close fitting to prevent the insertion of tools of sufficient strength to force the joints and the hollow members having portions projecting into the open end of adjacent members to close the same in all angular positions to which the members can move when in position on the body of the wearer, so that pressing the joints inwardly against the body of the wearer will not open the members, while permitting access to the members when the belt is not in position on the body of the wearer.

8. A safety belt comprising when in position on the body of the wearer a closed ring of hollow metallic members, each having an opening in one end and arranged end to end in close abutting relation to provide a substantially continuous double walled structure of material width and thickness, the members being connected together by hinged joints, the joints being close fitting to prevent the insertion of tools of sufficient strength to force the joints, and the hollow members having portions projecting into the open end of adjacent members to close the same in all angular positions to which the members can move when in position upon the body of the wearer, so that pressing the joints inwardly against the body of the wearer will not open the members, and the members being hinged together by detachable hinges permitting separation only in angular positions which the members cannot assume when the belt is in position on the body of the wearer.

9. A safety belt comprising when in position on the body of the wearer a closed ring formed of hollow metallic members, each having an opening in one end and arranged end to end in close abutting relation to provide a substantially continuous double walled structure of material width and thickness, the joints being close fitting to prevent the insertion of tools of sufficient strength to force the joints, the metallic hollow members being connected together by hinged joints and the end members being connected together by locking means, the belt when unlocked being capable of being reversed to disclose the ends of said hollow members, at least one end of the hollow members being open to gain access to the interior, and means for closing such open end when the belt is closed and in position upon the body of the wearer, said means operating to prevent access to said hollow members in any position which the belt can assume when in use about the person.

10. A safety belt comprising a plurality of metallic compartments having openings to permit access thereinto, and articulating means connecting a series of said compartments; some of such compartments having portions adapted to close the opening of an adjacent compartment when the said adjacent compartments are in any one of a plurality of relative angular positions with respect to each other.

11. A safety belt comprising a series of compartments having mouths for the introduction of valuables, such compartments being directly connected with each other and constituting substantially the entire belt, the connections between the compartments comprising hinging means whereby the belt can be opened by articulation of the compartments one on the other, and means on some of the compartments adapted to completely close the mouths of adjacent compartments when the said adjacent compartments are in any one of a plurality of relative angular positions which they could assume when in position on the body of the wearer, the said mouths being open only when the adjacent compartments are in a relative angular position, which they could not assume when in place on the body of the wearer.

12. A safety belt comprising a plurality of compartments capable of relative angular movement and having openings thereto and closure means disposed in position to close and open said openings with the relative angular movement of the compartments, the opening of a compartment being open only when said compartment and an adjacent compartment are in relative angular positions which they could not assume when in place on the body of the wearer.

13. A safety belt comprising a plurality of compartments having hinging connections one with another, said compartments having openings for the introduction of valuables and closure means carried by one compartment and extending completely across the opening of an adjacent compartment to open and close such opening with the movement of the adjacent compartments around the hinging connection, the opening of one compartment being open only when the said compartment and an adjacent compartment are in relative angular positions that they could not assume while in place on the body of the wearer.

14. A safety belt comprising a series of hingedly connected compartments having openings for the introduction of valuables, a portion of one compartment being adapted to extend into and close the opening of an adjacent compartment when the belt is in place on the body of the wearer, said portion also being adapted to be withdrawn from such closed position by the outward rotation of the said adjacent compartments around the hinged connection, the said opening being open only when the adjacent compartments are in a relative angular position which they could not assume when in place on the body of the wearer.

EUGENE V. MYERS.